(12) United States Patent
Qureshi et al.

(10) Patent No.: US 10,514,735 B2
(45) Date of Patent: Dec. 24, 2019

(54) POSITIONABLE COVER TO SET COOLING SYSTEM

(71) Applicant: Hewlett Packard Enterprise Development LP, Houston, TX (US)

(72) Inventors: Mohammed Fai Qureshi, Houston, TX (US); Kevin Conn, Montgomery, TX (US); Victoria Jeanine Doehring, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 109 days.

(21) Appl. No.: 15/757,973

(22) PCT Filed: Sep. 30, 2015

(86) PCT No.: PCT/US2015/053089
§ 371 (c)(1),
(2) Date: Mar. 6, 2018

(87) PCT Pub. No.: WO2017/058185
PCT Pub. Date: Apr. 6, 2017

(65) Prior Publication Data
US 2018/0246549 A1    Aug. 30, 2018

(51) Int. Cl.
| G06F 1/16 | (2006.01) |
| H05K 5/00 | (2006.01) |
| H05K 7/00 | (2006.01) |
| G06F 1/20 | (2006.01) |
| G06F 1/18 | (2006.01) |
| G05B 15/02 | (2006.01) |

(52) U.S. Cl.
CPC ............... G06F 1/20 (2013.01); G05B 15/02 (2013.01); G06F 1/18 (2013.01); G06F 1/181 (2013.01)

(58) Field of Classification Search
CPC ... G06F 1/20; G06F 1/206; G06F 1/18; G06F 1/181; G06F 1/182; G05B 15/02; G05B 15/00
USPC .................................................. 361/679.46
See application file for complete search history.

(56) References Cited

U.S. PATENT DOCUMENTS

| 6,278,608 | B1 | 8/2001 | Ater | |
| 6,891,347 | B2 | 5/2005 | Dobbs | |
| 6,924,977 | B2 | 8/2005 | Bestwick | |
| 7,035,102 | B2* | 4/2006 | Holmes ...................... | G06F 1/20 361/695 |
| 7,196,903 | B2 | 3/2007 | Vuong | |
| 7,466,547 | B2* | 12/2008 | Holmes ...................... | G06F 1/20 361/695 |
| 7,684,192 | B2* | 3/2010 | Holmes ...................... | G06F 1/20 165/104.33 |
| 7,848,105 | B2* | 12/2010 | Holmes ...................... | G06F 1/20 361/695 |
| 7,945,794 | B2* | 5/2011 | Chen ...................... | G06F 1/1616 713/300 |
| 8,639,963 | B2 | 1/2014 | Brundridge | |
| 9,250,681 | B2* | 2/2016 | Chang ...................... | G06F 3/042 |

(Continued)

Primary Examiner — Anthony M Haughton
(74) Attorney, Agent, or Firm — Hewlett Packard Enterprise Patent Department

(57) ABSTRACT

According to some examples, solutions are provided for setting a cooling system of a computer system chassis by a positionable cover disposed on a computer hardware component receivable by the computer system chassis.

14 Claims, 5 Drawing Sheets

(56) References Cited

U.S. PATENT DOCUMENTS

| | | | |
|---|---|---|---|
| 2004/0150958 A1* | 8/2004 | Calhoon | G06F 1/18 |
| | | | 361/725 |
| 2005/0152112 A1* | 7/2005 | Holmes | G06F 1/20 |
| | | | 361/695 |
| 2008/0030429 A1 | 2/2008 | Hailpern et al. | |
| 2009/0249862 A1 | 10/2009 | Glover | |
| 2010/0321874 A1 | 12/2010 | Bhattacharyya | |
| 2012/0215359 A1 | 8/2012 | Michael | |
| 2015/0172105 A1 | 6/2015 | Dube et al. | |

\* cited by examiner

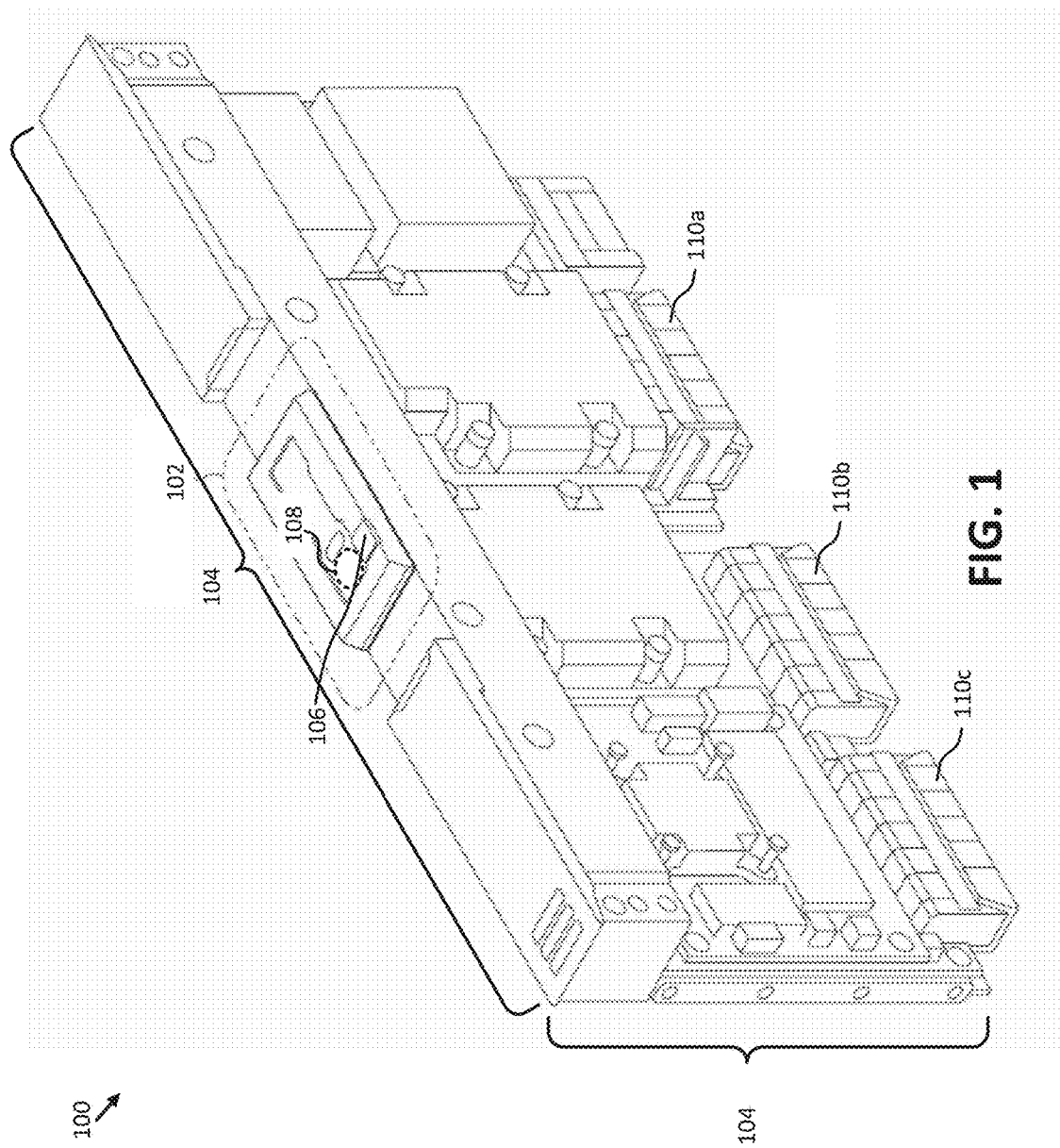

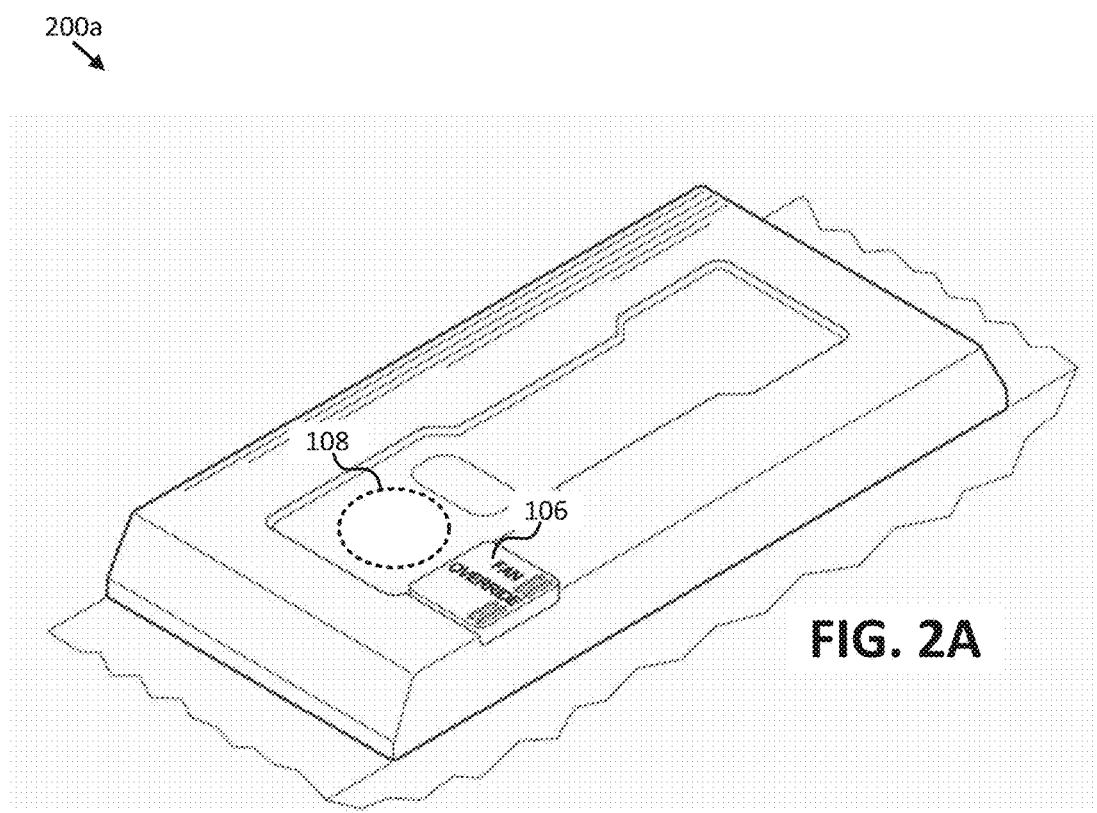

POSITIONABLE COVER TO SET COOLING SYSTEM

BACKGROUND

Some computer system chasses can scale up or customize their support of a range of server, storage, and network services by adding or replacing pluggable hardware modules (e.g., cartridges) to the computer system chasses. Such computer system chasses may share power, cooling, management (e.g., out-of-band management) and networking for a plurality of processor hardware modules (e.g., server cartridges). Each processor module may be hot-pluggable (e.g., insertable or removable while the computer system chassis is operational), thereby allowing them to be added, removed, examined (e.g., for operability), serviced, or replaced while the computer system chasses are operational. Other components of the computer system chasses may also be implemented as hot-pluggable hardware modules, such as network adapters or switches, memory, power supplies, data storage devices (e.g., hard disk drives), cooling elements (e.g., cooling fans).

BRIEF DESCRIPTION OF THE DRAWINGS

Certain examples are described in the following detailed description in sampled to the following drawings.

FIG. 1 is a rendering of an example computer hardware component according to the present disclosure.

FIGS. 2A and 2B present views of the example computer hardware component of FIG. 1.

DETAILED DESCRIPTION

Figure 2B:
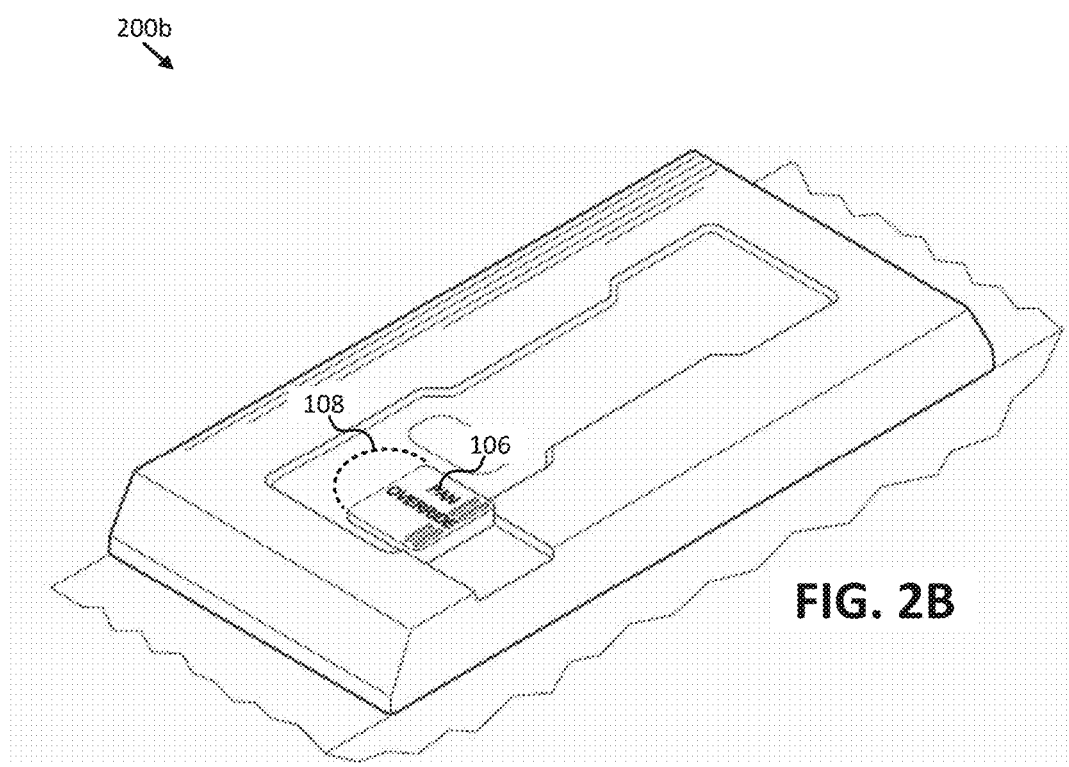

Various conventional computer systems are capable of being serviced while they continue to operate (herein referred to as being hot-servicable). Certain conventional computer systems facilitate this by including a chassis that permits an individual (e.g., computer technician or administrator) to physically access the chassis while the computer system is operating, and by permitting the individual to add, remove, replace or examine a computer hardware component installed in the chassis. An example of such a conventional computer system includes a rack-mount computer system that houses a plurality of processor hardware modules (e.g., server cartridges) that are hot-pluggable into a plurality of bays included by the chassis. This example can include a set of network modules (e.g., network cartridges) that are hot-pluggable and facilitate network communication for the processor hardware modules (e.g., data ingress and egress with respect to the compute cartridges installed in the rack-mount computer system).

To avoid hardware components installed in the chassis from overheating, conventional computer systems can include robust cooling systems (e.g., fan or liquid cooling) that can vary their level of operation (e.g., between 0 and 100% capacity) based on cooling needs and power conversation preferences. Since these cooling systems are often most effective when the computer system chassis is closed, for some conventional computer systems that are hot-serviceable, the cooling system may set their respective cooling systems to operate at a higher level than usual (e.g., 100%) when their chassis is opened for service purposes by an individual (e.g., cover is opened to replace a hot-pluggable component). Unfortunately, the noise level produced by such cooling systems while operating at a high level (e.g., 100%) can be quite unpleasant and uncomfortable for an individual physically accessing the open conventional computer systems.

According to various examples, solutions are provided for setting a cooling system of a computer system chassis (e.g., setting an operational mode of the cooling system) by a positionable cover disposed on a computer hardware component receivable by the computer system chassis.

For instance, some examples provide a positionable cover on the computer hardware component that permits an individual (e.g., a technician or administrator) to cause the computer hardware component to signal (e.g., instruct) the computer system chassis (in which the computer hardware is installed) to seta cooling system (e.g., fan-based cooling system) of the computer system chassis to a maintenance operational mode and override the current operational mode of the cooling system. The positionable cover may be a mechanical component disposed on board the computer hardware component such that an individual (e.g., user, technician, or administrator) can optionally slide the positionable cover over an optical sensor of the hardware component when they physically access an open computer system chassis in which the computer hardware component is installed. If the individual were to do this while the computer system chassis operating (e.g., the computer system is on), sliding the positionable cover (partially or completely) over the optical sensor can cause the computer hardware component signal the computer system chassis to set its cooling system to maintenance operational mode.

The optical sensor may be one that detects ambient light levels around the computer hardware component such that when the computer hardware component is installed in a computer system chassis, it can assist in determining whether the computer system chassis is open based on the detected light level. For some examples, when the optical sensor detects an ambient light level associated with the computer system chassis being closed (e.g., little or no light within the chassis), the computer hardware component may signal the computer system chassis to set its cooling system to an auto-regulate operational mode (e.g., set its fan between 0 and 100% of fan speed), which adjusts the cooling system settings based on the thermal cooling needs of various components of the computer system chassis. For some examples, when the optical sensor detects an ambient light level associated with the computer system chassis being open, the computer hardware component may signal the computer system chassis to set its cooling system to maximum operational mode (e.g., set its fan to 100% of fan speed) to keep various components with the computer system chassis cool as they continue to operate. As described herein, an individual sliding the positionable cover over the optical sensor may case the computer hardware component to signal the computer system chassis to override this maximum operational mode and set its cooling system to a maintenance operational mode (e.g., 35% of fan speed). For some examples, in maintenance operational mode, the cooling system produces less noise, which can be desirable to the individual accessing the open computer system chassis. In some instances, the cooling system can produce 85 decibels or more of sound when the cooling system is set to maximum operational mode (e.g., 100% of fan speed).

As used herein, examples of computer hardware components can include a processor hardware module (e.g., including a server cartridge), data storage hardware module (e.g., hard disk drive or solid state drive in an cartridge enclosure), a memory hardware module, a network hardware module (e.g., serving as an integrated network switch for various components within the computer system chassis), a power supply hardware module, an input/output hardware module, and the like. As also used herein, a cooling system can include a fan-based cooling system, a liquid-based cooling system (e.g., water cooling system), or the like.

The following provides a detailed description of the examples illustrated by FIGS. 1-4.

FIG. 1 is a rendering of an example computer hardware component 100 according to the present disclosure. In particular, FIG. 1 illustrates the computer hardware component 100 as comprising a computer component chassis 104, a set of connectors 110a-110c disposed on the computer component chassis 104, a positionable cover 106 disposed on the computer component chassis 104, and an optical sensor (not visible) disposed on the computer component chassis 104 at or about area 108. The computer hardware component 100 may further comprise a control module (not shown) which may be implemented by a set of hardware elements disposed on the computer component chassis 104. In various examples, the components or the arrangement of components of the computer hardware component 100 may differ from what is depicted in FIG. 1. For instance, the computer hardware component 100 can include more or less components than those depicted in FIG. 1.

The computer component chassis 104 receivable by a computer system chassis. Depending on the example, the computer component chassis 104 may take the form of a cartridge that is insertable (e.g., installable) into an open bay of the computer system chassis. The computer system chassis may include a framework that forms a plurality of bays, at least one of which can receive the computer hardware component 100. The computer component chassis 104 may include physical features that enable the computer hardware component 100 to be inserted and removed from the open bay while the computer system chassis is operating (e.g., make the computer hardware component 100 hot-pluggable). The computer system chassis may include, for instance, additional bays to receive other cartridges. As noted herein, the computer component chassis may include a processor hardware module, data storage hardware module, a memory hardware module, a network hardware, a power supply hardware module, and a data input/output (I/O) hardware module. The computer component chassis 104 may include an exterior surface that faces toward the opening of the computer system chassis when the computer hardware component 100 is installed in the computer system chassis. Depending on the example, the computer system chassis comprise be a rack-mount chassis (e.g., mountable in a data center) including at least one bay for receiving the computer hardware component 100.

The set of connectors 110a-110c operationally couple the computer hardware component to an infrastructure included by the computer system chassis receiving the computer hardware component 100. The connectors 110a-110c may comprise male or female data connectors that compliment connectors of the computer system chassis that is to receive the computer hardware component 100. Though a plurality of connectors are shown in FIG. 1, for some examples the computer hardware component comprises a single connector. The infrastructure of the computer system chassis can include a data input/output (I/O) distribution component and a connector coupled to the data I/O distribution and mateable with one or more of the connectors 110a-110c. The connector of the infrastructure may be arranged on a backplane such that they one or more of the connectors 110a-110c of the computer hardware component couple to the connector of the infrastructure when the computer hardware component 100 is inserted into the computer system chassis (e.g., one of its open bays). Through the infrastructure, the computer hardware component 100 can transmit a signal to a controller of the computer system chassis that is coupled to or included by the infrastructure. For instance, the controller may be one that supports server management on the computer system chassis, such as out-of-band management of the server (e.g., lights out management technology, such as HP Integrated Lights-Out [iLO]). The controller may be responsible for monitoring the thermals of a set of components included by the computer system chassis and regulate operation of a cooling system of the computer system chassis based on such thermals and the signal received from the computer hardware component 100.

The optical sensor (not visible) may detect ambient light level outside the computer hardware component 100. In particular, for some examples, the optical sensor measures the level of white light outside the computer hardware component 100. The optical sensor may be disposed underneath an area 108 of an exterior surface of the computer hardware component 100, where the area 108 may be sufficiently transparent (e.g., semi-transparent) to permit the optical sensor to detect light incident to the area 108 from the ambient environment of the computer hardware component 100. The optical sensor may be coupled to the control module of the computer hardware component 100 and provide the control module with data describing the level of ambient light detected by the optical sensor, or a voltage level describing the same. For instance, the optical sensor may output 2 volts when the positionable cover 106 is positioned (e.g., slid) over the optical sensor, which can cause the control module of the computer hardware component 100 to signal the computer system chassis to set its cooling system to maintenance operational mode (e.g., 35% of fan speed). As described herein, when the cover of the computer system chassis is open and the positionable cover 106 is not positioned over the optical sensor, the optical sensor can produce a voltage indicates that it recognizes white light, which can cause the control module of the computer hardware component 100 to signal the computer system chassis to set its cooling system to maximum operational mode (e.g., 100% of fan speed).

According to various examples, by measuring the ambient light level outside the computer hardware component 100, the optical sensor can measure the amount of light present within the internal cavity of the computer system chassis after the computer hardware component 100 has been inserted (e.g., installed) within the internal cavity of the computer system chassis. This can permit the optical sensor to inform the computer hardware component 100 when the computer system chassis is open, thereby causing light to enter the computer system chassis. Depending on the example, the computer system chassis may be open when a service cover (e.g., chassis housing cover) is opened (e.g., removed), thereby providing an individual to physically access to the internal cavity of the computer system chassis and its set of installed computer hardware components (e.g., the computer hardware component 100).

The positionable cover 106 may be disposed on the computer component chassis 104 such that it can selectively limit ambient light being received by the optical sensor (not shown) included by the computer component chassis 104. According to some examples, the positionable cover 106 can selectively limit the ambient light based on a position of the positionable cover on the computer component chassis 104. Depending on the example, the positionable cover 106 may be completely opaque and limit the light by blocking the light being received by the optical sensor, or may be semi-transparent and limit the light by filtering the amount or wavelength (e.g., color) of light being received by the optical sensor.

As shown in FIG. 1, the positionable cover 106 comprises a small slidable tab disposed on an exterior surface of the computer hardware component 100. In FIG. 1, the exterior surface on which the positionable cover 106 is disposed may serve as the front facade of the computer hardware component 100 when the computer hardware component 100 is inserted into a computer system chassis (e.g., an open bay of the computer system chassis.

In FIG. 1, the positionable cover 106 is disposed at a location on the exterior surface of the computer hardware component 100 adjacent to the area 108, under which the optical sensor may be disposed. The positionable cover 106 in FIG. 1 may be positionable such that an individual (e.g., technician or administrator) can physically vary the cover 106's position over the area 108. In this way, the positionable cover 106 can be selectively positioned over an optical sensor disposed under the area 108. The positionable cover 106 may be partially or completely opaque such that when positioned to partially or completely cover the area 108, the positionable cover 106 prevents some or all light (e.g., incident from the ambient environment of the computer hardware component 100) from passing through the area 108 to the optical sensor.

For some examples, the positionable cover 106 may comprise a mechanical switch (e.g., slidable switch) disposed away from the area 108 but that can selectively limit the light being received by the optical sensor (mechanically cause a cover underneath the area 108 to slide over the optical sensor).

As used herein, modules of various examples may comprise, in whole or in part, hardware (e.g., electronic circuitry), programming (e.g., machine-readable instructions), or a combination of both to implement functionalities described herein. For instance, a module may comprise computer-readable instructions executable by a processor to perform one or more functions in accordance with various examples described herein. In another instance, a module may comprise electronic circuitry to perform one or more functions in accordance with various examples described herein. In yet another instance, a module may comprise a combination of machine-readable instructions, stored on at least one non-transitory machine-readable storage medium, and at least one processing resource (e.g., processor or microcontroller) to execute those instructions.

The control module may transmit through at least one of the connectors 110a-110c a signal to an infrastructure included by the computer system chassis receiving the computer hardware component 100. The signal transmitted by the control module may be based on ambient light level detected by the optical sensor disposed on the computer hardware component 100 and may cause a cooling system included by the computer system chassis to be set (e.g., configured to operate) based on the signal, As described herein, the signal to the computer system chassis may cause the computer system chassis to override its current operational mode of the cooling system of the computer system chassis, where the current operational mode can include auto-regulate operational mode (e.g., based on the thermals of components within the computer system chassis), maximum operational mode, or static mode (e.g., operating at a static level of capacity). For some examples, when the optical sensor indicates that the cover of the computer system chassis is opened, the current operational mode of the cooling system would be maximum operational mode.

According to some examples, if the control module continuously signals the computer system chassis to set the cooling system to maintenance operational mode for longer than a predetermined time period (e.g., 10 minutes), the computer system chassis (e.g., the controller of the computer system supporting iLO) ignores the signal from the control module of the computer hardware component 100 and sets the cooling system to a default operational mode meant intended to override a maintenance operational mode (e.g., one associated with the computer system chassis being opened of service/maintenance, such as a maximum operational mode). When the predetermined time period elapses, the computer system chassis may also issue an alert regarding the maintenance operational mode remaining enabled and may log the event (e.g., generation an Integrated Management Log [IML] log error report).

FIGS. 2A and 2B respectively present views 200a and 200b of the computer hardware component 100 of FIG. 1. In particular, views 200a and 200b show section 102 of an exterior surface of the computer hardware component 100. As shown, the section 102 includes the area 108 under which the optical sensor of the computer hardware component 100 may be disposed, and further includes the positionable cover 106 disposed adjacent to the area 108. In view 200a, the positionable cover 106 is shown in a first position where the positionable cover 106 is not covering any portion of the area 108. According to some examples, when the positionable cover 106 is in this first position, the optical sensor of the computer hardware component 100 can detect the level of light outside the computer hardware component 100 (e.g., level of light within the computer system chassis in which the computer hardware component 100 is installed) without obstruction by the positionable cover 106. As described herein, this can permit the optical sensor assist in detecting when the computer system chassis is open.

In view 200b, the positionable cover 106 is shown in a second position where the positionable cover 106 is partially covering a portion of the area 108, thereby permitting a predetermined level of light to reach the optical sensor disposed beneath the area 108. According to some examples, when the positionable cover 106 is in this second position, the positionable cover 106 limits the amount of light (e.g., to a predetermined level) that the optical sensor can detect outside the computer hardware component 100 (e.g., level of light within the computer system chassis in which the computer hardware component 100 is installed). As described herein, when the computer system chassis is open and the positionable cover 106 is positioned as shown in FIG. 2B, this causes the optical sensor to detect a limited level of light that causes the computer hardware component 100 to signal the computer system chassis to set its cooling system to maintenance mode. For some examples, the positionable cover 106 can be positioned (e.g., slid) to other positions than those described or shown and such other positions which may trigger cause the optical sensor to trigger the computer hardware component 100 such that the computer hardware component 100 signals the computer system chassis to set its cooling system to an alternative operational mode (e.g., different grade of maintenance mode that auto-regulates the fan speed within a range).

Figure 3:
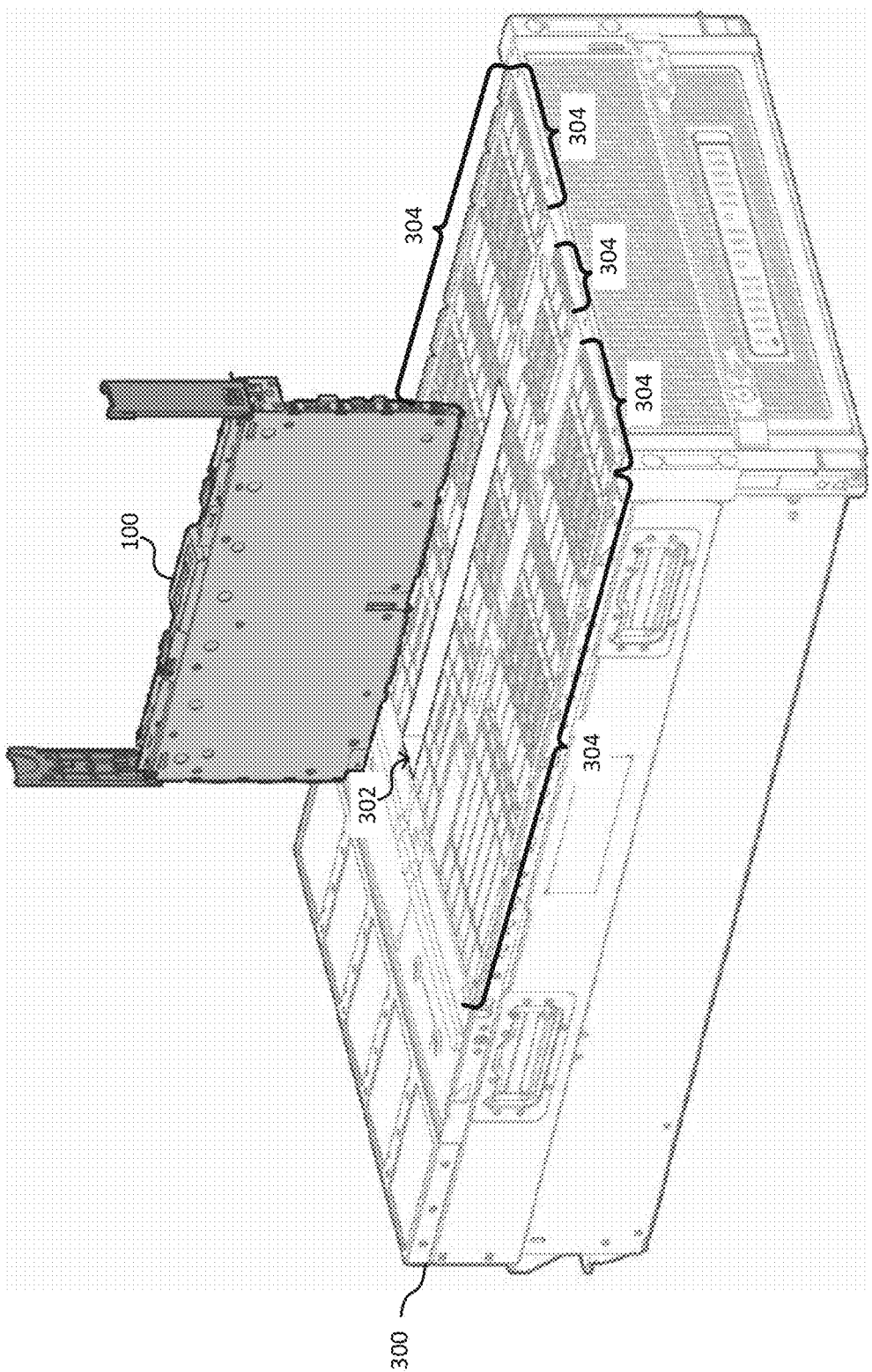
FIG. 3 is a rendering illustrating an example computer system chassis with the example computer hardware component of FIG. 1 according to the present disclosure.

FIG. 3 is a rendering illustrating an example computer system chassis 300 with the computer hardware component 100 of FIG. 1 according to the present disclosure. As shown, the computer system chassis 300 includes a plurality of bays 304 that are top accessible. For some examples, the computer system chassis 300 may include a removable cover (not shown) that covers some or all of the plurality of bays 304. As also shown, the plurality of bays 304 includes an open bay 302 into which the computer hardware component 100 of FIG. 1 may be inserted (e.g., installed). As described herein, the computer system chassis 300 may include an infrastructure comprising a backplane, and one or more of the connectors 110a-110c of the computer hardware component 100 may couple to this backplane when the computer hardware component 100 is inserted into the open bay 302 (e.g., at the bottom of the open bay 302), The computer system chassis 300 may include additional computer hardware components similar to the computer hardware component 100, which may inserted into (e.g., installed) into the other bays of the plurality 304.

Figure 4:
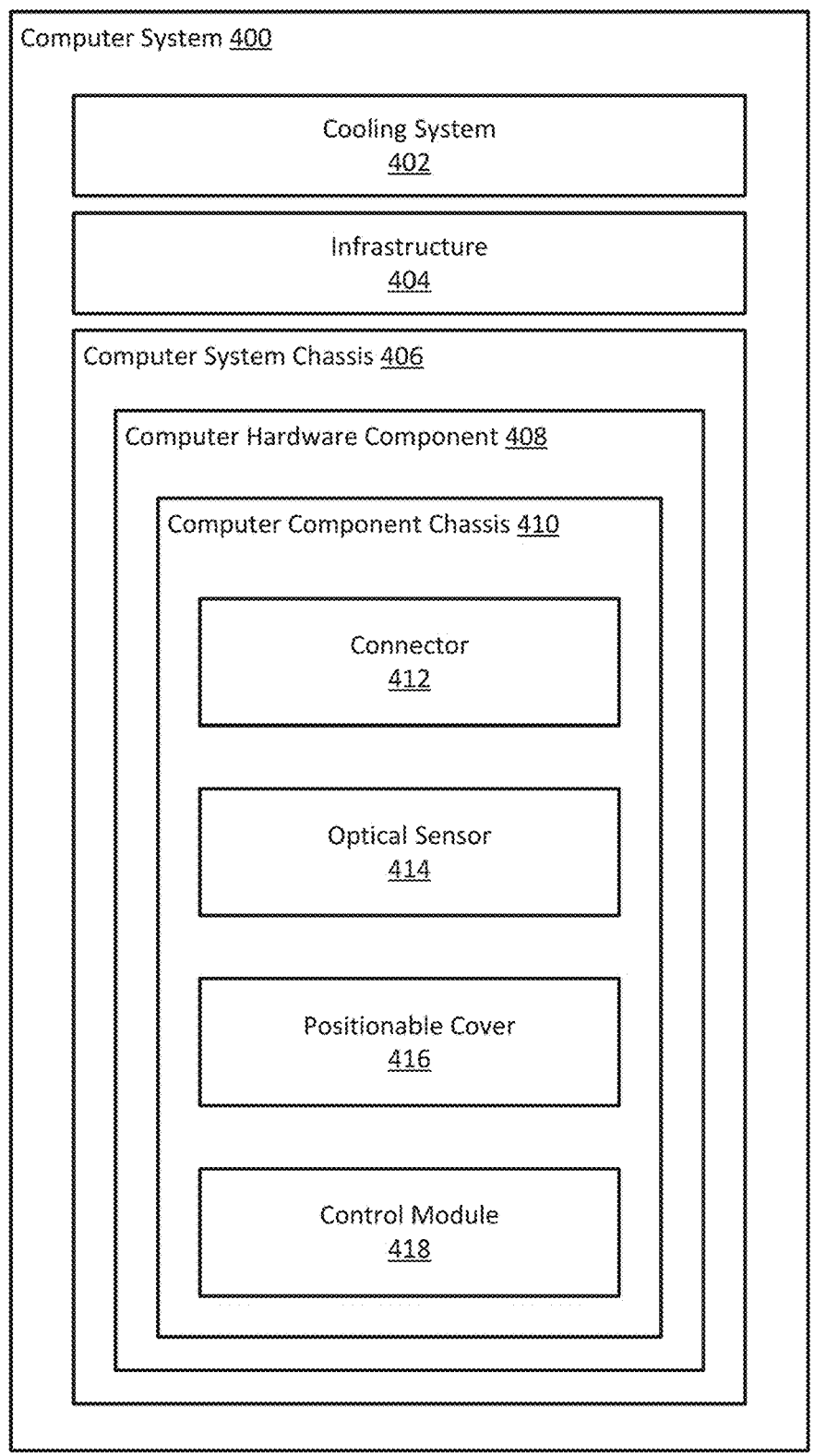
FIG. 4 is a block diagrams illustrating an example computer system according to the present disclosure.

FIG. 4 is a block diagram illustrating an example computer system 400 according to the present disclosure. In FIG. 4, the computer system 400 as illustrated includes a cooling system 402, an infrastructure 404, and a computer system chassis 406, As also shown, the computer system chassis 406 includes a computer hardware component 408 that comprises a connector 412, an optical sensor 414, a positionable cover 416, and a control module 418. In various examples, the components or the arrangement of components of the computer system 400 may differ from what is depicted in FIG. 4. For instance, the computer system 400 can include more or less components than those depicted in FIG. 4.

As described herein, the cooling system 402 may include a fan-based cooling system, a liquid-based cooling system (e.g., water cooling system), or any other system utilized in cooling components of a computer system. The infrastructure 404 can include a data input/output (I/O) distribution component and a connector coupled to the data I/O distribution and mateable with the connector of 412, The infrastructure 404 can facilitate the computer hardware component 100 transmitting a signal to the computer system chassis 406 (e.g., a controller of the computer system chassis 406), based upon which the computer system chassis 300 can set the operational mode of the cooling system 402.

According to various examples, the computer hardware component 408 may be similar (e.g., in structure and function) to the computer hardware component 100 described above with respect to FIG. 1. For instance, the computer component chassis 410, the connector 412, the optical sensor 414, the positionable cover 416, and the control module 418 of the computer hardware component 408 may be similar to its counterparts of the computer hardware component 100.

In the foregoing description, numerous details are set forth to provide an understanding of the subject disclosed herein. However, various examples may be practiced without some or all of these details. Some examples may include modifications and variations from the details discussed above. It is intended that the appended claims cover such modifications and variations.

The invention claimed is:

1. A computer hardware component, comprising:
a computer component chassis receivable by a computer system chassis;
a connector disposed on the computer component chassis to operationally couple the computer hardware component to an infrastructure included by the computer system chassis;
an optical sensor disposed on the computer component chassis to detect ambient light level outside the computer hardware component;
a positionable cover disposed on the computer component chassis to selectively limit ambient light being received by the optical sensor based on a position of the positionable cover on the computer component chassis; and
a control module disposed on the computer component chassis to transmit through the connector a signal to the infrastructure based on the detected ambient light level, the signal to set a cooling system included by the computer system chassis.

2. The computer hardware component of claim 1, wherein the optical sensor detects the ambient light at an exterior surface of the computer hardware component, and the positionable cover is disposed on the exterior surface.

3. The computer hardware component of claim 1, wherein the signal instructs the infrastructure to set the cooling system to auto-regulate operational mode when the detected ambient light level indicates that a cover of the computer system chassis is closed.

4. The computer hardware component of claim 3, wherein the signal instructs the infrastructure to set the cooling system to a maximum operational mode when the detected ambient light level indicates that the cover of the computer system chassis is open.

5. The computer hardware component of claim 3, wherein at a first position, the positionable cover limits the ambient light to the optical sensor such that the detected ambient light level is at a first level that indicates that the cover of the computer system chassis is open, wherein at a second position, the positionable cover permits a predetermined level of ambient light to be received by the optical sensor, and wherein the signal instructs the infrastructure to set the cooling system to a maintenance operational mode when the detected ambient light level is at the predetermined level.

6. The computer hardware component of claim 5, wherein the maintenance operational mode causes the cooling system to operate at 35% capacity.

7. The computer hardware component of claim 1, wherein the computer hardware component operates as a network switch for another computer hardware component operationally coupled to the infrastructure.

8. A computer system, comprising:
a cooling system;
an infrastructure;
a computer system chassis;
a computer hardware component included in the computer system chassis, the computer hardware component including:
a computer component chassis receivable by the computer system chassis;
a connector disposed on the computer component chassis to operationally couple the computer hardware component to the infrastructure;
an optical sensor disposed on the computer component chassis to detect ambient light level outside the computer hardware component;
a positionable cover disposed on the computer component chassis to selectively limit ambient light being received by the optical sensor based on a position of the positionable cover on the computer component chassis; and
a control module disposed on the computer component chassis to transmit through the connector a signal to the infrastructure based on the detected ambient light level, the signal to set the cooling system.

9. The computer system of claim 8, wherein the optical sensor detects the ambient light at an exterior surface of the computer hardware component, and the positionable cover is disposed on the exterior surface.

10. The computer system of claim 8, wherein the signal instructs the infrastructure to set the cooling system to auto-regulate operational mode when the detected ambient light level is at a first level that indicates that a cover of the computer system chassis is closed.

11. The computer system of claim 10, wherein the signal instructs the infrastructure to set the cooling system to a maximum operational mode when the detected ambient light level is at a second level that indicates that a cover of the computer system chassis is open.

12. The computer system of claim 10, wherein at a first position, the positionable cover limits the ambient light to the optical sensor such that the detected ambient light level is at a second level that indicates that a cover of the computer system chassis is open, wherein at a second position, the positionable cover permits a predetermined level of ambient light to be received by the optical sensor, and wherein the signal instructs the infrastructure to set the cooling system to a maintenance operational mode when the detected ambient light level is at the predetermined level.

13. The computer system of claim 12, wherein the maintenance operational mode causes the cooling system to operate at 35% capacity.

14. The computer system of claim 8, wherein the computer hardware component operates as a network switch for another computer hardware component operationally coupled to the infrastructure.

* * * * *